No. 728,151. PATENTED MAY 12, 1903.
C. BÄKER.
TIME FUSE FOR ARTILLERY PROJECTILES.
APPLICATION FILED FEB. 12, 1903.
NO MODEL.
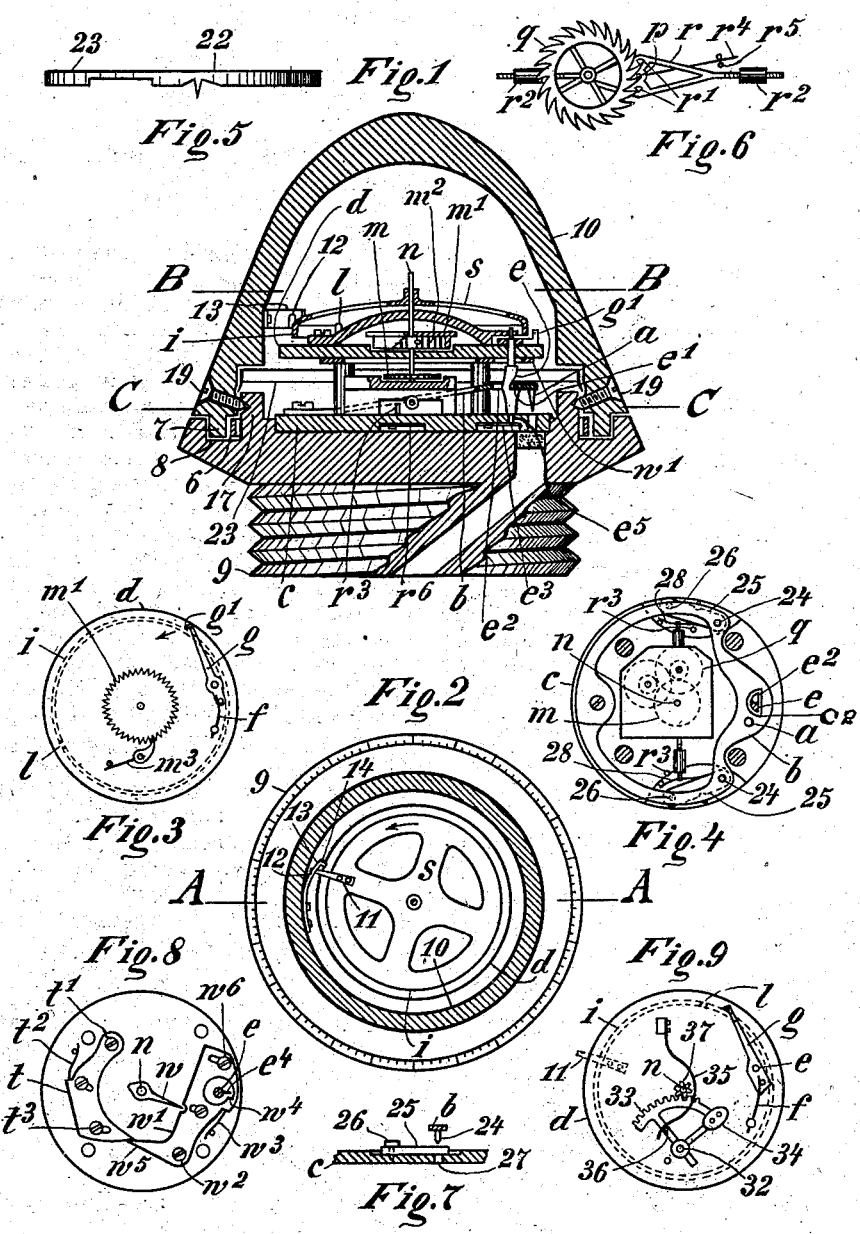
Witnesses:
Ellis Owen.
John Smith.
Inventor
Carl Bäker
by
Attorney.

No. 728,151. Patented May 12, 1903.

UNITED STATES PATENT OFFICE.

CARL BÄKER, OF BERLIN, GERMANY.

TIME-FUSE FOR ARTILLERY PROJECTILES.

SPECIFICATION forming part of Letters Patent No. 728,151, dated May 12, 1903.

Application filed February 12, 1903. Serial No. 143,110. (No model.)

*To all whom it may concern:*

Be it known that I, CARL BÄKER, a subject of the German Emperor, residing at 8 Dennewitzstrasse, Berlin, Germany, have invented certain new and useful Improvements in and Relating to Time-Fuses for Artillery Projectiles, of which the following is a specification.

This invention relates to a time-fuse for artillery projectiles which has a firing-spring carrying a nipple, which firing-spring after the expiration of a certain variable time is released and the ignition effected by the impact of the nipple on the percussion-cap. The release of the firing-spring takes place by clockwork mechanism having a very rapidly operating balance and escapement, which on firing off the projectile starts working and after a certain time causes a projection or shoulder which holds the firing-spring in tension to move to the side, thus causing the explosion of the projectile.

The characteristic features of the clockwork employed in the present invention for the release of the igniting or striking spring are the very rapidly vibrating balance and the dead-beat or repose escapement. The great number of vibrations (at least sixty and up to three hundred in a second) offers the following advantages:

First. It enables the necessary setting of the fuse to small fractions of a second.

Second. It permits the use of a comparatively strong balance-spring which is necessary to overcome the friction on the balance-wheel bearings induced by the centrifugal force resulting from rotation of the shell. It further permits the retention of a slight weight in the balance. The weight of the balance must be kept down to the utmost, because the friction on the bearings of the balance would otherwise increase to a prohibitive degree in consequence of the centrifugal force resulting from rotation.

Third. With a rapid vibration the balance has, in spite of its light weight, a far-reaching power of endurance in ability to effect regulation in the clockwork, which latter, owing to great friction on the wheel-bearings due to centrifugal force, must be driven by a very strong spring. A restricted weight is, however, a desideratum, as already stated, for it insures the reciprocal advantage of favoring rapidity of vibration per second.

Fourth. The dead-beat or repose escapement is necessary, because I have found that since the axis of the projectile's rotation during flight is not always coincident with the geometric axis of the projectile the pressure on the pivots of the wheels and balance due to centrifugal action changes during the flight of the projectile and a varying degree of friction has to be overcome by the driving power, the driving power being transmitted to the balance with ununiformity, and with an ununiform driving force a constant movement can be attained only by use of a dead-beat or repose escapement. A recoil-escapement runs faster with increased driving power and more slowly with diminished driving power.

By means of a suitable adjusting device the lapse of time between the starting to work of the clockwork mechanism and the attainment of the position in which the firing-spring is released in the manner described may be exactly adjusted to small fractions of a second.

The invention relates also to a special arrangement for adjusting the clockwork mechanism, in which arrangement the copper cap is turnable and is coupled with an adjusting-disk of the clockwork mechanism by a connection being disengaged in firing off the projectile, and, furthermore, to a safety device which prevents the premature release of the firing-spring and injury to the clockwork mechanism in firing off the projectile.

The invention is illustrated in a number of examples in the accompanying drawings, in which—

Figure 1 is a vertical section on the line A A, Fig. 2. Fig. 2 is a horizontal section on the line B B, Fig. 1. Fig. 3 is an elevation of the top plate of the clockwork mechanism and of the spring-casing. Fig. 4 is a section through the clockwork mechanism on the line C C, Fig. 1. Figs. 5 to 8 illustrate details. Fig. 9 represents another example of driving mechanism.

The priming arrangement is of following construction: The nipple $a$ is mounted upon an annular spring $b$, Figs. 1 and 4, which is fixed at one side upon the base-plate $c$ of a clockwork mechanism and may strike through a hole in this plate $c$ upon a copper cap disposed beneath it, which cap, however, is not illustrated. The firing-spring $b$ lies against a projection or shoulder $e'$ of a locking-bolt $e$ when the said spring is in tension. The said bolt is carried through a semicircular hole $e^2$ in the firing-spring $b$ and is turnably mounted in both the plates $c$ and $d$ of the clockwork mechanism. In the position illustrated in Fig. 1 the shoulder or projection $e'$ engages beneath the firing-spring $b$ and holds this latter away from the plate $c$. In the position illustrated in Fig. 4 the shoulder or projection allows the firing-spring to drop upon the plate $c$. The upper end of the bolt $e$, projecting above the plate $d$, carries the locking-lever $g$, Fig. 3. This lever when the firing-spring is in tension has its upwardly-projecting end $g'$ outside the locking-ring $i$, which ring is provided with a slot $l$ and is formed by the peripheral diverted edge of an adjusting-disk $s$, which is fixed upon the spindle $n$ of a wheel $m$ of the clockwork mechanism. The adjusting-disk $s$ is turnable upon the spindle $n$, but with such friction as to cause the disk to move when the spindle is rotating.

The rotation of the locking-bolt $e$ in the direction of the arrow is only possible if the slot $l$ of the locking-ring faces the upwardly-projecting end $g'$ of the locking-lever $g$. Then the latter may turn in the direction of the arrow indicated in Fig. 3 under the action of a spring $f$ to such an extent that the firing-spring $b$ may fall from the shoulder or projection $e'$ of the locking-bolt $e$, with which it is in engagement. By making the shorter end of the lever $g$ heavier than the longer end the spring may be dispensed with, centrifugal force being sufficient to operate the lever. The lower end of the locking-bolt $e$ has a reduced supporting extremity $e^5$, which rests upon a plate-spring $e^3$. In firing off the charge the spring $e^3$ gives in to such an extent that the main part of the locking-bolt lies upon the plate $c$, so that the supporting extremity $e^5$ is prevented from bending. The wheel $m$, and with it the locking-ring, is caused to turn by the clockwork mechanism. This latter consists of three wheels, the first of which, $m$, is placed in the center of the clockwork mechanism. As the driving element a clock-spring $m^2$ is employed, which at one end is fixed to the casing $m'$, being rotatable upon the plate $d$, and at the other end on the spindle $n$. In turning the casing $m'$ the clock-spring $m^2$ is wound up.

A spring-pressed pawl $m^3$ engages in the teeth provided at the edge of the casing and prevents the casing from turning back.

The escapement is formed by two pins $r'$, fixed either integral or otherwise on the balance, with which pins the escapement-wheel $q$ engages. The balance $r$ has two arms which are provided with screw-threads, carrying two adjusting-weights $r^2$. The spiral spring of the ordinary clockwork mechanism is in this case substituted by a straight or undulating spring $r^4$, which at one end is fixed in a hole of the axis $p$ of the balance, while the other end plays between two pins $r^5$. The balance performs sixty to three hundred vibrations per second, according to the proportion of the number of teeth.

In order to prevent injury on firing off the projectile, the pin of the axis $p$ of the balance, in addition to the locking-bolt $e$, is supported below by a spring $r^6$. On the firing off the spring yields. The arms of the balance being somewhat elastic are bent on firing off the projectile and come to lie upon the plate $c$, while the pins $r^3$, Fig. 4, fixed upon the latter, over which the arms swing away freely in the ordinary course, protect them against sudden turns.

In order to release the clockwork mechanism the moment of firing off and in order to secure it against the unintended release by shock, the following arrangement is employed: Upon the spindle $n$ of the wheel $m$ an arm $w$ is fixed, which engages in a recess of the lever $w'$, Fig. 8. The latter is turnable on the under side of the plate $d$ around the axis $w^2$ and is held in the position indicated in Fig. 8 by a spring $w^3$ and lies against a fixed pin. This pin also secures the locking-bolt $e$, carried through the lever, and has a pin $e^4$, fixed in said locking-bolt, lies against a projection $w^4$. Thus one attains that the projection $g'$ of the locking-lever $g$ does not lie directly against the locking-ring $i$, but only when the pin $e^4$ is set free by the projection $w^4$.

If the lever by the centrifugal force arising in firing off the projectile swings outwardly in consequence of the turning of the projectile, it sets free the axis $n$ and the locking-bolt $e$, and the clockwork mechanism may then start running. To prevent the premature release by shock, the lever $w'$ is secured by the lever $t$, which swings around an axis $t'$, lying approximately diametrically opposite the axis $w^2$, and which is kept in the position indicated in Fig. 8 by a spring $t^2$. The end of this lever comes to lie against a prolongation $w^5$ at the rear end of the lever $w'$ and prevents its movement in the direction of the arrow. The release takes place only when by the centrifugal force causes both levers to move outwardly—i. e., in reverse directions. Screws $w^6$ and $t^3$ pass through slots in the levers $w'$ and $t$, the slots being concentrically provided to the turning axis $w^2$ or $t'$. The said screws are provided with heads, and thus hold the levers.

The adjustment of the fuse is performed by turning by hand the copper cap, which is rotatably secured upon the fuse-stock. The copper cap 10 is turnably provided upon the lower part 9 of the fuse, which is screwed upon the projectile. For securing the cap upon the base a projection 17, having a groove, is provided, in which two or more screws 19 engage with their pointed ends, so that the cap may be still turned freely without play. For greater security, besides the projection 17 a recess 8 is formed, in which engages a corresponding projection 7 on the cap 10. By the provision of a spring 6 in this recess the cap turns with sufficient friction.

The adjusting-disk $s$ is provided with an outwardly-projecting pin 11, Fig. 2, which engages in a slot 12 of a spring 13, fixed within the copper cap 10, so that in the turning of the cap 10 the locking-ring $i$ is also caused to turn, Figs. 1 and 3. This spring, which is provided immediately beside this slot with a projection 14, projecting inwardly, is bent outwardly by centrifugal force in firing off the projectile, so that the pin 12 is set free toward the side to which it is moved in the movement of the clockwork mechanism, which is the direction of the arrow indicated in Fig. 2. The pin is prevented from turning in the opposite direction by the projection 14, so that in firing off the projectile the locking-ring may not be put out of place.

In order to prevent the copper cap 10 from turning against the under part 9 in firing off, the ring 23, provided with a number of points 22, Fig. 5, is displaceably arranged in the interior of the copper cap 10. This ring may be closed or broken at one place. By the shock in firing off the projectile the ring is moved against the under part 9, and the angular points 22 are pressed between the projection 17 and the cap 10. At the under part 9 a scale or division into degrees, Fig. 2, is provided, while the cap 10 has a mark or indicator, which is not illustrated. By means of this arrangement the adjustment may be effected exactly according to the desired duration of running.

For greater security against premature ignition and shock in firing off the projectile two or more pins 24 are provided in the annular firing-spring, Figs. 4 and 7, under the pointed ends of which pins two small blocks 25 are placed, without, however, being in contact with them in the normal position, which blocks may turn around the screws 26, provided on the plate $c$. These blocks are held in the normal position illustrated in Fig. 4 by springs 28, and thus cover two holes 27 in the plate $c$, in which holes the pins may strike when the firing-spring $b$ falls, Fig. 7, after the blocks are pressed outwardly by centrifugal force. If on account of any cause the firing-spring would fall off from the locking-bolt $e$ before the action of centrifugal force upon the blocks, then the firing-spring comes to lie with the two pointed pins upon the blocks 25 and maintains these blocks in their normal position. In this case the ignition would not be effected. Furthermore, these blocks 25 have for their purpose to serve as support to the firing-spring, so as to prevent the excessive bending by the shock in firing off the projectile. By these supports for the firing-spring, furthermore, the blocks 25 are held in their normal position for such time as the velocity of the projectile increases—i. e., so long as it is in the barrel—so that ignition in the barrel is thus impossible.

Instead of the driving by the spring $m^2$ the driving of the clockwork mechanism may be performed by centrifugal force or by the combination of the latter and a spring. This is illustrated in Fig. 9. In this figure, upon the spindle $n$ a toothed pinion 37 is mounted in which engages the toothed segment 33, pivoting on the pin 32. The toothed segment is provided with a weight 34, which is pressed outwardly by centrifugal force, and thus causes the wheel $m$ to turn. As the weight 34 at the commencement lies near to the center, and therefore acts with less power than later, a spring 35 is provided for balancing the difference of power, which spring by pressure upon a pin 36 on the toothed segment 33 augments with decreasing power the action of centrifugal force.

The spring 35 when strong enough may alone serve as the motive power.

What I claim as my invention, and desire to secure by Letters Patent, is—

1. A time-fuse having a releasable firing device, and a clockwork releasing said firing device after the lapse of a predetermined period of time; said clockwork having a dead-beat or repose escapement positively fixing the running of the clockwork at a constant rate and constructed to vibrate at a very large number of vibrations per second.

2. In a time-fuse, the combination with the firing-nipple and mechanism for controlling the same, of a cap to effect the adjustment of the time of ignition and a coupling between the mechanism and the cap released upon the firing of the projectile.

3. In a time-fuse, the combination with the firing-nipple and mechanism for controlling the same, of a cap to effect the adjustment of the time of ignition, and a coupling between the mechanism and the cap moved by centrifugal force to release the mechanism which controls the nipple.

4. In a time-fuse, the combination with the spring-pressed firing-nipple, and a slotted ring, of mechanism for rotating the ring to release the firing-pin, a cap to effect the adjustment of the time of ignition, and a coupling between the ring and the cap, moved by centrifugal force to release the slotted ring.

5. In a time-fuse, the combination with the spring-pressed firing-nipple and a slotted ring, of mechanism for rotating the ring to release the firing-pin, an outwardly-projecting pin carried with the ring, a cap to effect the adjustment of the time of ignition, and a slotted spring carried by the cap, normally in engagement with the pin carried with the slotted ring and thrown out of engagement therewith by centrifugal force.

6. In a time-fuse, the combination with the spring-pressed firing-nipple, and a slotted ring, of mechanism for rotating the ring to release the firing-pin, an outwardly-projecting pin carried with the ring, a cap to effect the adjustment of the time of ignition, a slotted spring carried by the cap normally in engagement with the pin carried with the slotted ring and thrown out of engagement therewith by centrifugal force, and a projection carried by the slotted spring to prevent the pin turning in the opposite direction.

7. In a time-fuse the combination with the fuse-stock and a cap adapted to turn thereon, of a ring provided with a plurality of points adapted to be forced between the cap and the fuse-stock upon firing to prevent turning of the cap.

8. In a time-fuse, the combination with the fuse-stock provided with a grooved projection, 17, and a recess, 8, of a cap adapted to turn thereon and provided with a projection adapted to fit within the recess of the fuse-stock, screws carried by the cap and adapted to enter the groove of the projection, 17, and a ring positioned in the recess of the fuse-stock to provide friction between the parts.

9. In a time-fuse, the combination with the firing-nipple and means for releasing the same at a predetermined time, of independent means to prevent the movement of the firing-nipple until firing, moved by centrifugal force.

10. In a time-fuse, the combination with the firing-spring, the firing-nipple, and means for releasing them at a predetermined time, of pins carried by the firing-spring, and blocks normally held in the path of the pins and moved out of said path on firing.

11. In a time-fuse, the combination with the firing-nipple, and the firing-spring, of means releasing the spring at a predetermined time, and independent means preventing the movement of the spring, and moved by centrifugal force.

12. In a time-fuse, the combination with the firing-nipple, and the firing-spring, of mechanism releasing the spring at a predetermined time, means operated on firing releasing the said mechanism, and means locking the spring against movement independent of the said mechanism, also moved on firing to release the spring.

13. In a time-fuse, the combination with the firing-nipple and the firing-spring, of clockwork mechanism releasing the spring at a predetermined time, centrifugally-operated means releasing the said mechanism on firing, means locking the spring against movement independent of the clockwork mechanism, also moved by centrifugal force on firing to release the spring.

14. In a time-fuse, the combination with the firing-nipple, a rotatable locking-bolt for the same, and a clockwork mechanism for releasing said locking-bolt, of a lever holding the clockwork mechanism and the locking-bolt against movement, and moved by centrifugal force to unlock both simultaneously.

15. In a time-fuse, the combination with the firing-nipple, a rotatable locking-bolt for the same, and a clockwork mechanism for releasing said locking-bolt, of a lever holding the clockwork mechanism and the locking-bolt against movement, and moved by centrifugal force to unlock both simultaneously, and another lever holding the first-mentioned lever against movement until the last-mentioned lever is moved by centrifugal force.

16. In a time-fuse, the combination with the firing-nipple and a rotary locking-bolt for the same, of a spindle, a clockwork mechanism connected with the spindle, means connected with the spindle for releasing said locking-bolt, a pin on the locking-bolt, an arm on the spindle, a lever provided with a notch in which the arm on the spindle fits and a projection with which the pin on the locking-bolt engages, said lever being moved by centrifugal force to release the spindle and the locking-bolt.

17. In a time-fuse, the combination with the firing-nipple, and a rotary locking-bolt for the same, of a spindle, a clockwork mechanism connected with the spindle, means connected with the spindle for releasing said locking-bolt, a pin on the locking-bolt, an arm on the spindle, a lever provided with a notch in which the arm on the spindle fits, a projection with which the pin on the locking-bolt engages, said lever being moved by centrifugal force to release the spindle and the locking-bolt, a prolongation on the lever, a second lever adapted for engagement with the prolongation on the first lever to prevent the movement of the first lever until the second lever is moved by centrifugal force in a reverse direction.

18. In a time-fuse, the combination with the spring-pressed firing-nipple and a rotary locking-bolt for the same, of a clockwork mechanism for releasing said locking-bolt, and a yielding plate for the locking-bolt.

19. In a time-fuse, the combination with the spring-pressed firing-nipple, of a clockwork mechanism for releasing said firing-nipple, a balance for the clockwork mechanism having a spindle, and a yielding plate for the spindle of the balance.

20. In a time-fuse, the combination with the spring-pressed firing-nipple, of a clockwork mechanism for releasing said firing-nipple having an escapement-wheel, and a balance for the clockwork mechanism having two pins for engagement with the escapement-wheel, two arms, weights on the arms, and a spring.

21. In a time-fuse, the combination with the spring-pressed firing-nipple, of a clockwork mechanism for releasing said spring-pressed firing-nipple, having an escapement-wheel; and a balance for the clockwork mechanism, having two pins for engagement with the escapement-wheel, two arms, adjustable weights on the arms, and a flat spring.

22. In a time-fuse, the combination with the spring-pressed firing-nipple, of a clockwork mechanism for releasing said spring-pressed firing-nipple, having an escapement-wheel;

a balance for the clockwork mechanism having two pins for engagement with the escapement-wheel, two arms, adjustable weights on the arms, a flat spring, a yielding plate for the spindle of the balance, and means for securing the balance against turning when the balance yields on firing to prevent injury to the same.

23. In a time-fuse, the combination with the spring-pressed firing-nipple, of a plate through which said nipple works, a clockwork mechanism for releasing said spring-pressed firing-nipple, having an escapement-wheel; a balance for the clockwork mechanism having two pins for engagement with the escapement-wheel, two arms, adjustable weights on the arms, and a flat spring; of pins carried by the plate through which the nipple works, and a yielding plate for the spindle of the balance to permit it to yield on firing and engage with the pins to prevent its turning.

In witness whereof I have signed my name to this specification in the presence of two subscribing witnesses.

CARL BÄKER.

Witnesses:
HENRY HASPER,
WOLDEMAR HAUPT.